United States Patent [19]

Kotani et al.

[11] Patent Number: 4,763,292
[45] Date of Patent: Aug. 9, 1988

[54] PRINTER CONTROLLER

[75] Inventors: Yasuhiro Kotani, Nara; Koichi Oda, Sakai; Shoichi Kawai, Osaka, all of Japan

[73] Assignee: Sharp Kabushiki Kaisha, Osaka, Japan

[21] Appl. No.: 859,197

[22] Filed: Apr. 28, 1986

Related U.S. Application Data

[63] Continuation of Ser. No. 484,461, Apr. 13, 1983, abandoned.

[30] Foreign Application Priority Data

Apr. 14, 1982 [JP] Japan .................................. 57-67287
Apr. 14, 1982 [JP] Japan .................................. 57-62790

[51] Int. Cl.$^4$ .............................................. G06F 3/12
[52] U.S. Cl. .................................................. 364/710
[58] Field of Search ................ 364/710, 900 MS File, 364/200 MS File, 519, 400, 405

[56] References Cited

U.S. PATENT DOCUMENTS

| | | | |
|---|---|---|---|
| 3,920,979 | 11/1975 | Kilby et al. | 364/705 |
| 4,044,228 | 8/1977 | Kishimoto et al. | 364/710 |
| 4,164,789 | 8/1979 | Toyomura et al. | 364/710 |
| 4,237,541 | 12/1980 | Mikada | 364/710 |
| 4,344,147 | 8/1982 | Sado et al. | 364/710 |
| 4,386,412 | 3/1983 | Ito | 364/710 |
| 4,486,741 | 12/1984 | Nozawa et al. | 364/709 |

OTHER PUBLICATIONS

Musch et al., "Portable Scientific Calculator Has Built in Printer", *H. P. Journal*, vol. 28, #3, pp. 9-18, Nov. 1976.
The Caset FR101 operation manual, pp. 1-8, Mar. 1983.
Computer Dictionary and Handbook-Sippl et al.-Howard W. Sams & Co. Inc.-Third Edition-1980-p. 78.

*Primary Examiner*—Gary V. Harkcom
*Assistant Examiner*—Dale M. Shaw
*Attorney, Agent, or Firm*—Birch, Stewart, Kolasch, & Birch

[57] ABSTRACT

An electronic calculator apparatus includes a keyboard for inputting numerical and function data, a printer for printing out on a record medium a sequence of data input by the keys and calculation results related to the data, and a printer controller for determining the content and format of the data printed out. The printer controller has the capability of recognizing when two successive function keys are actuated, and instructs the printer to print out on the record medium two successive function symbols without any numerical data symbols therebetween corresponding to symbols on the successively actuated function keys. Accordingly, an operator may study the record medium and locate amended function input data in regions where two function symbols ar juxtaposed.

1 Claim, 5 Drawing Sheets

| Key Operation | (I) | (II) |
|---|---|---|
| 1 | | |
| 2 | | |
| × | 12    × | 12    × |
| ÷ | 12    ÷ |       ÷ |
| 4 | | |
| + | 3    + | 4    + |

| Key Operation | Display | Print |
|---|---|---|
| 12.3400 | 12.3400 | |
| [X] | 12.34 | 12.3400   X |
| 2 | 2. | |
| [=] | | 2.   = |
| | 24.68 | 24.68   X |
| 0.23 [EXP] 3 | 0.23E03 | |
| [X] | 230. | 0.23E03   X |

FIG. 4

PRINTER CONTROLLER

This application is a continuation of application Ser. No. 484,461 filed on Apr. 13, 1983, now abandoned.

BACKGROUND OF THE INVENTION

The present invention relates to an electronic apparatus and, more particularly, to a printer controller for an electronic apparatus including an electronic calculator.

In conventional apparatuses, parts of a formula are printed. If a function key is depressed in error, the operator may amend the function before calculation by depressing the desired function key in immediate succession. Upon the amendment of a function key, the digits before the amendment and the function symbol which is amended are both printed as shown in FIG. 3(I) and as follows:

| an amended formula: 12 × 12 ÷ 4 + | |
|---|---|
| input data | printed data |
| 12 × | 12 × |
| − replaces × | 12 − |
| 4 + | 3 + or (3 = 12 − 4) |

Therefore, it is difficult to determine whether the printed data is part of the formula or incorrectly inputted data, because the printed data does not directly correspond to the intended inputted data. Hence, conventionally, it is difficult to identify the succession of correctly inputted data and key operations from the printed data.

Further, in conventional functional calculators incorrectly inputted data along with calculated data are printed out in a normalized format. Therefore, it is difficult to determine whether the printed data is actually used in the intended calculation or is inputted data that has later been amended.

SUMMARY OF THE INVENTION

Accordingly, it is an object of the present invention to provide an improved printer controller for an electronic apparatus for printing out intended input data.

It is a further object of the present invention to provide an improved printer controller for eliminating the printing of incorrectly inputted data which is later replaced by intended data.

It is a further object of the present invention to provide an improved printer for printing out inputted data before normalization according to a calculator.

Briefly described, in accordance with the present invention, an electronic apparatus comprises a CPU, a printer, and a printer controller, so that the printer controller directs printing out of intended data and avoids printing out numerical data when some function command is corrected. The printer controller comprises a first and second detection means and a first and second print control mode. When the first detection means detects the depression of a numerical key successively followed by a function key, the first print control mode is selected to print out the numerical data and the function symbol. When the second detection means detects that at least two function keys are successively depressed, the second print control mode is selected to solely print a last selected function symbol without corresponding numeral symbol. When viewing the print data, this format identifies the amendment of a function command during the input of data for calculation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1 and 5 show a block diagram of a printer controller circuit according to the present invention;

FIGS. 3 and 4 show a table indicating the relation between inputted data and printed data according to the present invention; and FIG. 6 shows a memory format of a RAM as connected to the circuit of FIG. 5.

DESCRIPTION OF THE INVENTION

Figures 1, 3:
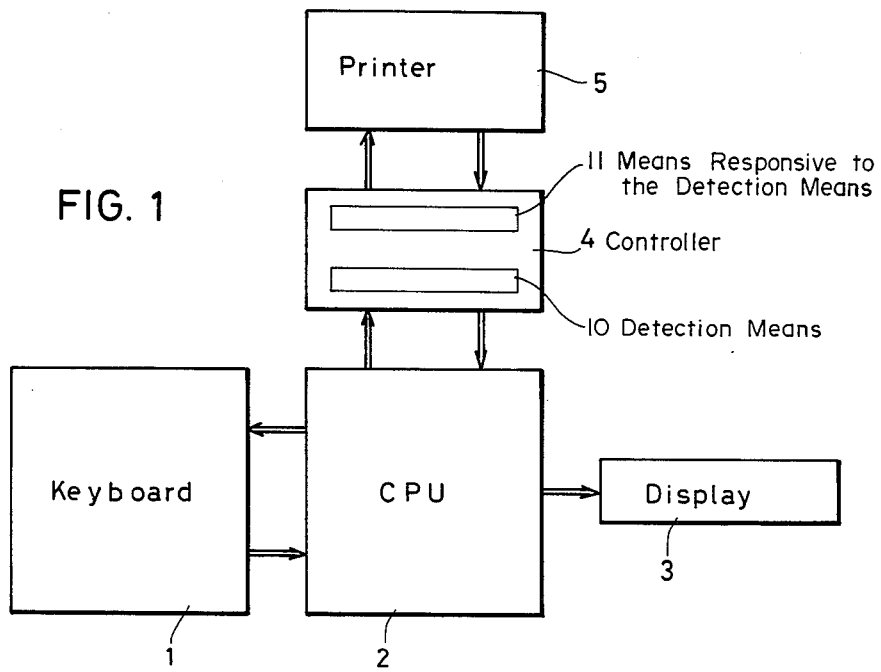

FIG. 1 shows a block diagram of a printer controller circuit according to the present invention. The circuit of FIG. 1 comprises a keyboard 1, a CPU 2, a display 3, a controller 4, and a printer 5. The keyboard 1 includes ten numerical keys each operated to input a single digit, and function keys to activate function commands in a manner consistent with a conventional calculator. The CPU 2 includes several registers A, B, C, X, Y, and Z. The X register stores data to be printed. The CPU 2 is responsive to key input data from the keyboard for calculating and outputting display data to the display 3 and print data to the controller 4.

The display 3 is responsive to the display data from the CPU 2 and will display the data. The controller 4 is responsive to print data from the CPU 2 for controlling the printer 5. The print data from the CPU 2 are character codes for each single line of print.

The keyboard 1 contains a printer key "PRT" separate and distinct from the function and numerical keys. This printer key controls the printing of input data during the calculation process.

Figure 2:
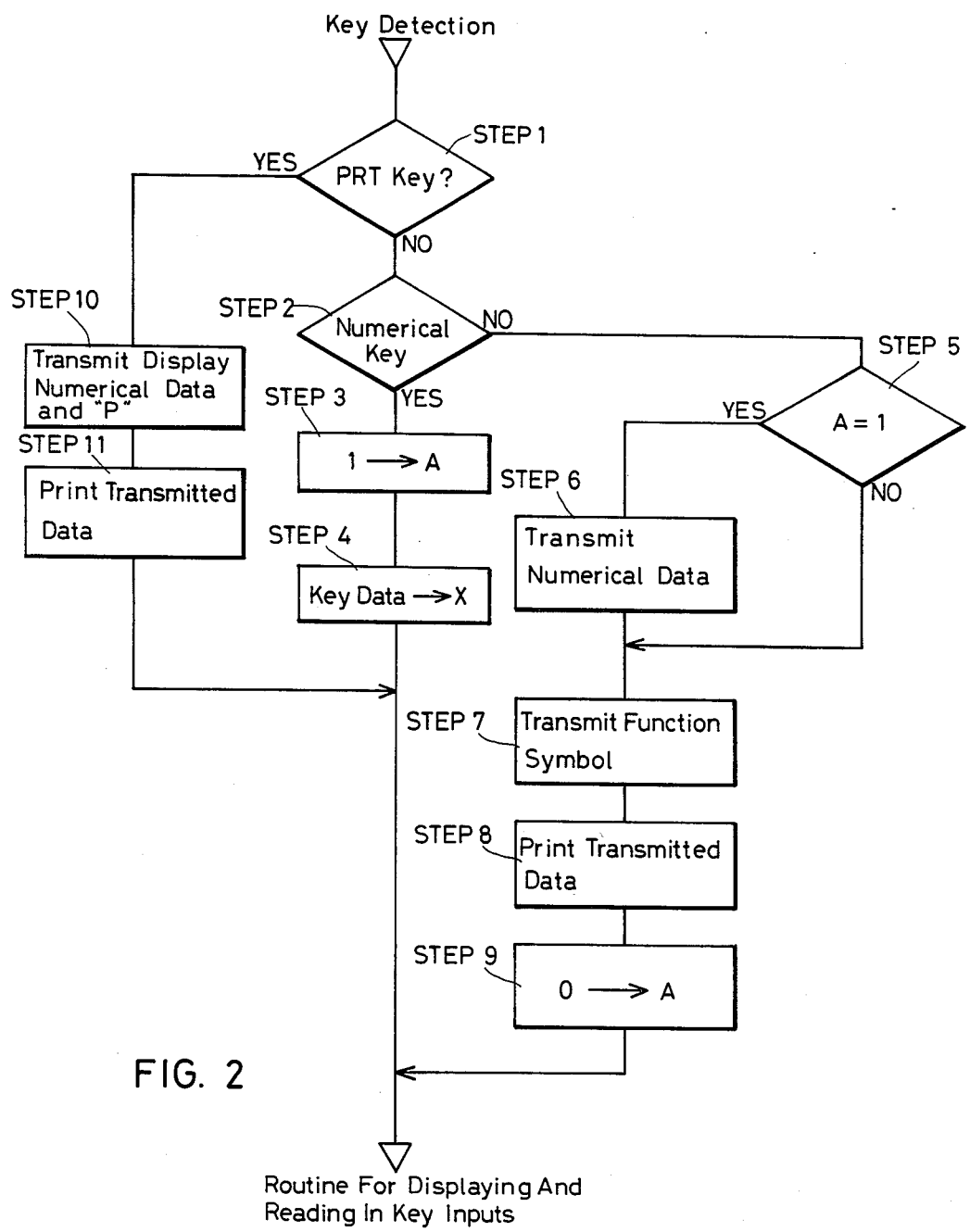
FIGS. 2 and 7 show a flow chart of each of the operations of the circuits of FIGS. 1 and 5.

FIG. 2 shows a flow chart of the operation of the circuit of FIG. 1. Steps 1 and 2 in this figure indicated that when a key is operated, steps 1 and 2 are selected to detect the type of key actuated. Step 1 is intended to determine whether the "PRT" key is actuated. If so, the printer controller proceeds to Steps 10 and 11. Step 2 is executed to detect whether or not a numerical key is operated. In Step 3 it is detected whether a numerical key has been actuated and a "1" is then stored into the A register of the CPU 2. Step 4 causes numerical data as related to the actuated numerical key to be entered into the X register of the CPU 2. Thereafter, the numerical data are displayed and stored in the CPU 2. However, if at Step 2, it is detected that a numerical key has not been depressed, Step 5 follows.

In Step 5 of FIG. 2, when some function key is actuated, the contents of the A register are examined as to whether they contain the flag "1" that signifies that a numerical key has been depressed. Then, Step 6 is executed when the numerical data as stored in the A register is "1". In Step 6, the numerical data are transmitted to the printer 5. However, if the A register is not equal to "1" then Step 6 is bypassed and the numerical data is not sent to the printer 5. In Step 7, the related function symbol is transmitted into the printer 5. In Step 8, the transmitted data are printed out. Next in Step 9, the contents of the A register are cancelled and the contents are set to "0". Thereafter, the display and key read-in routine are selected.

In Step 5 when the A register stores "0", Step 7 is directly selected without proceeding to Step 6. In Step 7, the function symbol is solely transmitted and in Step 8, the transmitted function symbol is printed out.

The steps following Steps 2 and 5 are enabled by a first and second detection means both represented by numeral 10 in FIG. 1, and, a first and second print means which is responsive to these detection means 10, both being represented by numeral 11 in FIG. 1 of the present invention so as to control the operations to be described below.

If "1" is stored in the A register, the first detection means detects that a digit key is operated followed by a function key and, the first print mode is selected to print the digit and the function symbol. If "0" is stored in the A register, the second detection means detects that at least two function keys are successively operated and the second print mode is selected to print the inputted function symbol alone. Thus, corresponding numerical data will not be printed.

Proceeding to Step 10 of FIG. 2, if during Step 1 the "PRT" key has been depressed, the previously displayed numerical data and the mark "P" (as related to the print key "PRT") are transmitted to the printer 5. Then in Step 11, the transmitted data is printed out.

The operations of Steps 10 and 11 indicate that the print key "PRT" is actuated to print parts of a formula during the calculation process. This printing operation is identified by the printing of the mark "P" with any print data.

FIG. 3 shows a table for comparing the relation between input data and printer data contrasting conventional controller systems with the present invention. FIG. 3(I) is related to the conventional case as described in the "BACKGROUND OF THE INVENTION" and FIG. 3(II) is related to the present invention.

As shown in FIG. 3(II), the data similar to the intended input data are printed in a formal reflective of the actual input data. If the operator depresses a function key (×) successively followed by a second function key (÷), only the second function key (÷) will be printed without the previously printed numerical data (12).

FIG. 4 shows a table for comparing the key input data with the display/print data according to another preferred form of the present invention.

When "12.3400" is inputted, the key input data is displayed. However, when a function key is operated, the key input data is normalized by a calculator so as to comply with a standard display format for the calculator. More particularly, the mantissa "1.234" and the index "01" are stored in a register. To display the key input data, the stored data is recorded in a display format. It is possible to display the data with or without the index in conjunction with the related mantissa.

The key input data is printed as "12.3400". This format is the same as the initial inputted data. Thus, the key inputted data is printed before normalization in the calculator.

Even when indexed data such as "0.23 EXP 3" is inputted, the key inputted data is printed in the same format.

Figures 5, 6:
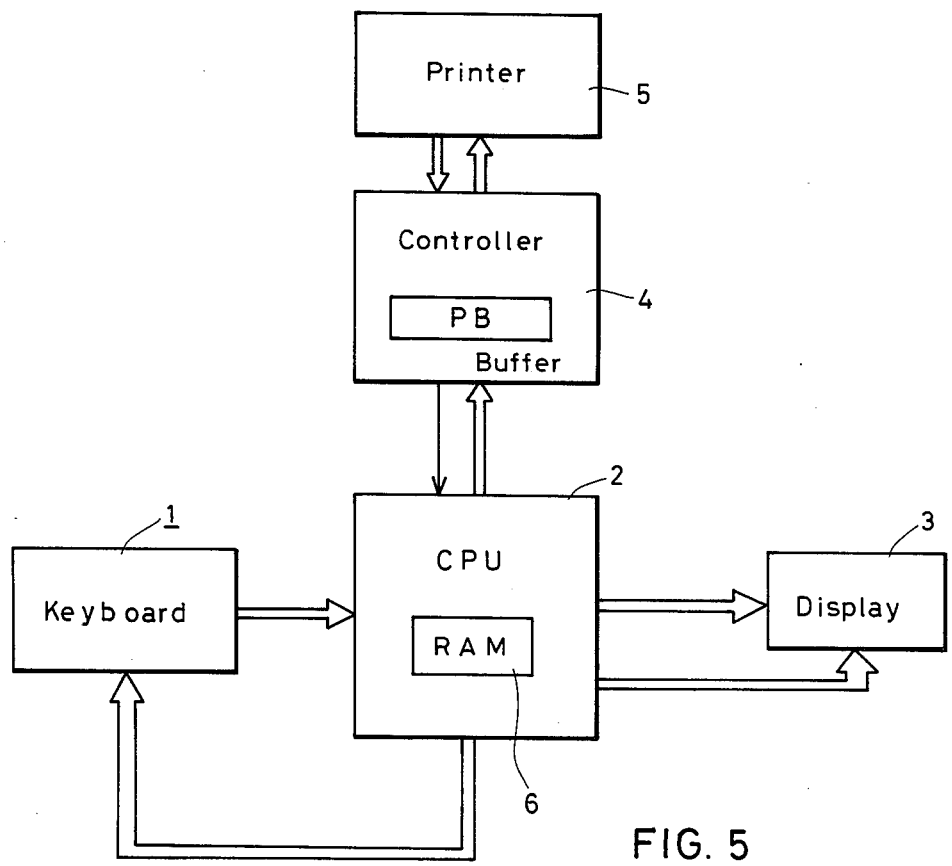

FIG. 5 shows a block diagram of a printer controller circuit according to another preferred form of the present invention. The circuit of FIG. 5 is similar to the circuit of FIG. 1 except that the CPU 2 includes a RAM 6 and a controller 4 with a buffer PB. The CPU 2 generates and receives key strobe signals from the keyboard 1. The display 3 receives display signals from the CPU 2.

FIG. 6 shows a register format of the RAM 6 within the CPU 2. The RAM 6 comprises several registers A, B, C, D, X, Y, and Z utilized in performing various calculations and additionally functioning as buffers. A buffer FR provided within the RAM 6 stores a function symbol as outputted. A location TB is provided for storing information for selecting a tab position.

The X register stores the inputted numerical data and calculated results. The key inputted data are normalized so that the mantissa data is stored in a location x1 and the index data is stored into a location x2. During the key inputting operations, the key inputted data is stored in the X register without storing them in the locations x1 and x2. A location y1 is provided for storing the digit number and the position of a decimal point during the key inputting operations.

Figure 7:
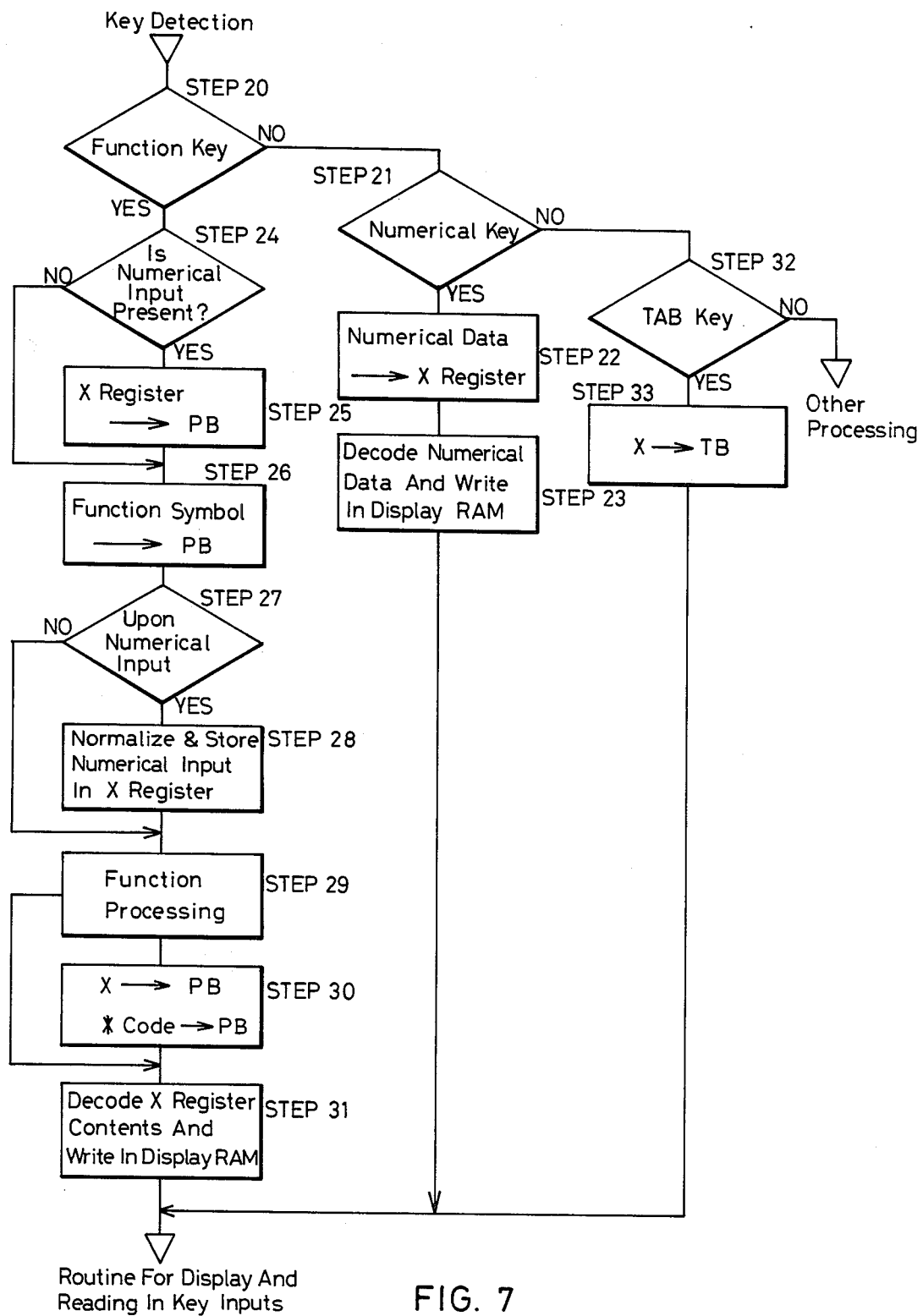

FIG. 7 shows a flow chart of the operation of the circuit of FIG. 5. In Steps 20, 21, and 24, when a key is operated, the type of key is detected. Step 20 is provided to detect whether a function key is depressed. If a function key is not detected, Step 21 is executed to detect whether a numerical data key is depressed. In Step 22, the numerical data are entered into the X register. In Step 23, the numerical data are decoded and displayed by writing them into a display RAM for generating segment signals. Based on the contents of the X register and the location y1, the numerical data is decoded and written into the display RAM.

If a function key is detected in Step 20 as seen in FIG. 7, Step 24 is executed to detect whether an operation of the function key successively follows the operation of a numerical key. If a numerical key is depressed in Step 24, the Step 25 is executed to transfer the contents of the X register into the buffer PB. If no numerical key is detected, the printer controller proceeds to Step 26. The Step 26 may then be executed to transfer the function symbol data into the buffer PB. Steps 25 and 26 enable the printer 5 to print out "12.3400 X" as shown in FIG. 4 without normalizing the key input data with the help of the first detection means and the first print mode of the present invention.

The Step 27 of FIG. 7 is executed to detect whether the operation of a numerical key follows. Step 28 is executed to normalize the numerical data and store the normalized data in the X register. In Step 29 after the numerical data is normalized, the numerical data is processed in the CPU in response to the previously selected function command.

The Step 30 of FIG. 7 is selected when the function is for calculating the final results of a computation, including SIN, COS, etc. This step is intended to transfer the calculated results as stored in the X register into the buffer PB. A "*" code is placed in the buffer PB to indicate that the printed data is the calculated results. Therefore, the result "24.68 *" is printed as shown in FIG. 4 to illustrate the print format utilized in Step 29.

The Step 31 of FIG. 7 is executed to decode the contents of the X register so as to store the decoded data into the display RAM for display purposes. In step 32, if no function key is detected in Step 20 nor a numerical key in Step 21, this step is executed to select a tab. To select the tab, the "TAB" key is successively operated after a numerical key is operated. The Step 33 is then executed to store the tab data into the location TB. The decode caused in Steps 23 and 31 is based on the contents of the location TB.

While only certain embodiments of the present invention have been described, it will be apparent to those skilled in the art that various changes and modifications may be made therein without departing from the spirit and scope of the present invention as claimed.

What is claimed is:

1. In an electronic calculator apparatus having a keyboard with numerical keys and function keys for inputting numerical and function data, a printer for printing out data input by the numerical and function keys as well as calculation results related to the data input, and printer controller means for controlling the format and content of data printed out by the printer, an improvement in said printer controller means comprising:

detection means for determining if two function keys are actuated in succession without the actuation of a numerical key in between, and generating a signal indicative thereof; and means responsive to said signal for causing said printer to print out on the record medium successive function symbols without numerical data symbols therebetween in the sequence of input data printed on the record medium, said function symbols corresponding to the symbols on the function keys which were successively actuated;

whereby an operator may observe the record medium and locate amended function key input data on the record medium.

* * * * *